United States Patent [19]

Sugiyama

[11] Patent Number: 4,942,814
[45] Date of Patent: Jul. 24, 1990

[54] OPERATION STAND FOR MEASURING SHEET SIZE FOR SHEET-FED PRESS

[75] Inventor: Osamu Sugiyama, Shizuoka, Japan

[73] Assignee: Shinohara Machinery Co., Ltd., Shizuoka, Japan

[21] Appl. No.: 391,876

[22] Filed: Aug. 10, 1989

[51] Int. Cl.$^5$ .............................................. B41F 13/24
[52] U.S. Cl. .................................. 101/232; 271/176; 364/561; 364/571.02; 118/712; 209/546; 355/311
[58] Field of Search ............... 101/481, 232; 355/311; 209/546; 271/176, 171, 223, 227, 245; 400/703; 364/560–562, 571.01, 571.02; 118/712; 33/1 B

[56] References Cited

U.S. PATENT DOCUMENTS

| | | | |
|---|---|---|---|
| 891,034 | 6/1908 | Bogasch | 101/481 |
| 3,601,045 | 8/1971 | Shinke et al. | 101/232 |
| 3,681,582 | 8/1972 | Kimio et al. | 33/1 B |
| 3,684,081 | 8/1972 | Matsuo | 101/232 |
| 4,375,921 | 3/1983 | Morander | 364/560 |
| 4,607,834 | 8/1986 | Dastin | 271/223 |
| 4,687,107 | 8/1987 | Brown et al. | 364/560 |
| 4,736,313 | 4/1988 | Nishimura et al. | 364/561 |
| 4,882,988 | 11/1989 | Yamaguchi | 101/232 |

FOREIGN PATENT DOCUMENTS 60-38741  3/1985  Japan .

*Primary Examiner*—Eugene H. Eickholt
*Attorney, Agent, or Firm*—Ladas & Parry

[57] ABSTRACT

The specification discloses an operation stand provided to a sheet-fed press.

This operation stand has stopper means set up at the end portions of a table surface of the operation stand and adapted to restrict the positions of the longitudinal and lateral edges of paper, a suction means adapted to apply vacuum to said paper through numerous suction holes provided in the table, so as to bring the paper into close contact with and fix the same to the table surface, a detecting means adapted to scan the paper with a detector with reference to guide shafts extending under the table surface in the longitudinal and lateral directions of the paper and detect the positions of the longitudinal and lateral edges of the paper, an arithmetic means for calculating the size of the paper on the basis of the information on the positions of the edges thereof from the detecting means, and a display means for digitally displaying the size of the paper calculated by the arithmetic means.

The operation stand for a sheet-fed press according to the present invention has an advantageous effect that the size of paper can be measured simply and accurately by utilizing the flat table surface without modifications to it.

1 Claim, 5 Drawing Sheets

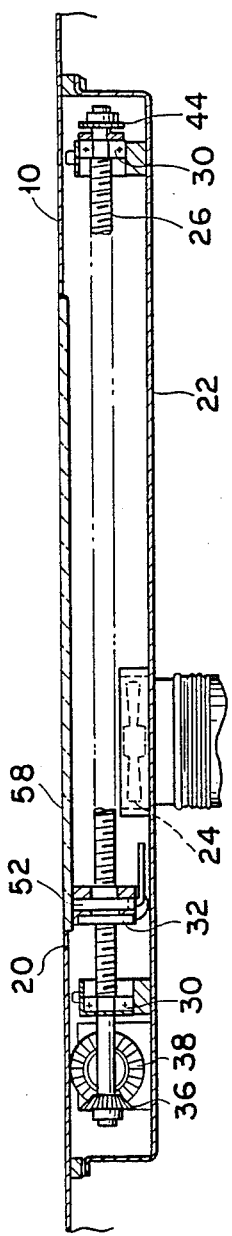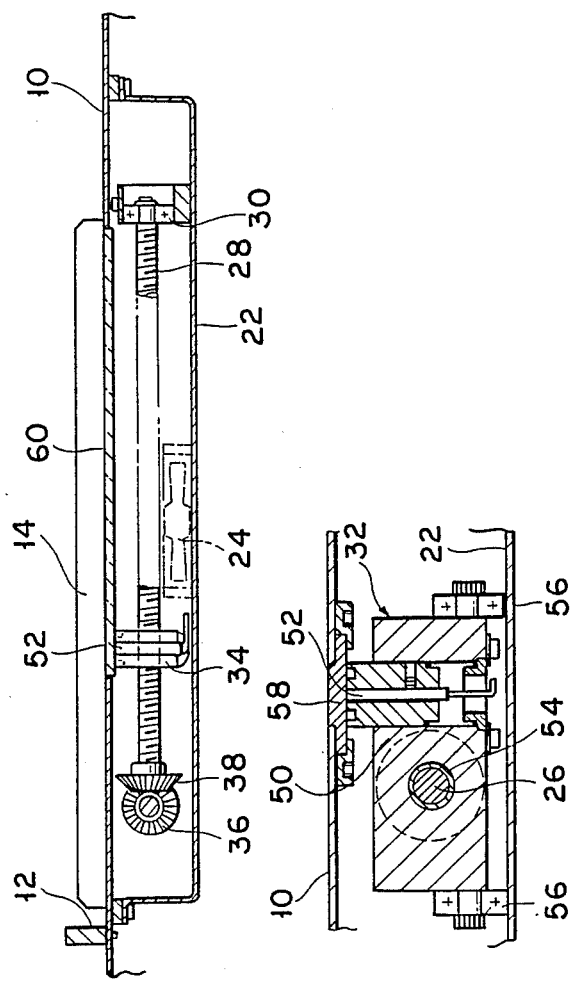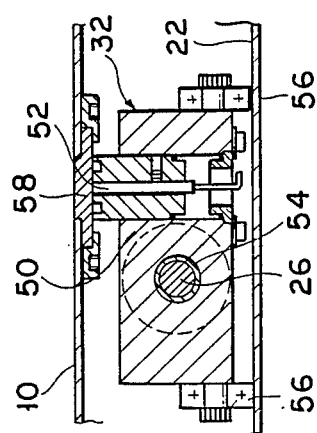
FIG. 3
FIG. 4
FIG. 5

OPERATION STAND FOR MEASURING SHEET SIZE FOR SHEET-FED PRESS

BACKGROUND OF THE INVENTION

A. Field of the Invention

This invention relates to an operation stand provided to a sheet-fed press, and more particularly to an operation stand provided to a sheet-fed press, which is capable of measuring the size of paper simply and accurately by utilizing its flat table surface without modifications to it.

B. Prior Art

An operation stand, an accessory apparatus for a sheet-fed press, is provided primarily for the purpose of remotely controlling the quantity of ink as disclosed in, for example, Japanese Utility Model Laid-open No. 38741/1985. The density of ink is studied after test printing paper has been placed on a flat table surface thereof, and the quantity of ink is then regulated by a push-button pressing operation.

Since various sizes of paper is inserted into a printing machine, it is necessary that the length and width of paper be accurately measured. Accordingly, for example, the position of a sucker in a feeder, and various devices in a printing machine body, such as a sheet brake and a paper setter in a delivery unit are regulated.

In a conventional printing machine of this kind, the size of the paper to be printed is measured with separately prepared rule, and the measured values are inputted to various devices in the printing machine body, various kinds of adjustments being then made.

SUMMARY OF THE INVENTION

However, it is extremely inconvenient to spread the paper to be printed over a place other than a flat table surface originally provided to an operation stand, and measure the size of the paper with a rule. In addition, it takes much time and labor to note down the measured values and input these values to various devices in a printing machine, and there is the posibility that the measured values is erroneously inputted.

The present invention, which has been developed in view of these problems, provides an advanced operation stand. An object of the present invention is to provide an operation stand capable of measuring the size of paper simply and accurately by utilizing a flat table surface thereof as it is.

To achieve this object, the operation stand for a sheet-fed press according to the present invention has stopper means set up at the end portions of a table surface of the operation stand and adapted to restrict the positions of the longitudinal and lateral edges of paper, a suction means adapted to apply vacuum to the paper through numerous suction holes provided in the table, so as to bring the paper into close contact with and fix the same to the table surface, a detecting means adapted to scan the paper with a detector with reference to guide shafts extending under the table surface in the longitudinal and lateral directions of the paper and detect the positions of the longitudinal and lateral edges of the paper, an arithmetic means for calculating the size of the paper on the basis of the information of the positions of the edges thereof from the detecting means, and a display means for digitally displaying the size of the paper calculated by the arithmetic means.

The paper the size of which is to be measured is placed on the flat table surface of an operation stand as the positions of the longitudinal and lateral edges thereof are restricted by the stopper means and determined.

A vacuum is then applied to the lower surface of the paper by the suction means to bring the paper into close contact with and fix the same to the table surface.

The paper is then scanned with an optical detector with reference to the guide shafts extending under the table surface in the longitudinal and lateral directions of the paper, to detect the positions of the longitudinal and lateral edges of the paper.

The size of the paper is then calculated by the arithmetic means of the basis of the information on the positions of the edges of the paper from the detecting means, and the results of the calculation are displayed digitally by the display means.

The above and other objects of the present invention will become apparent from the following description of the preferred embodiment taken in conjunction with the accompanying drawings. These drawings merely show an embodiment of the present invention, and the present invention is not limited to this embodiment.

BRIEF DESCRIPTION OF THE DRAWINGS

FIG. 3 is a sectional view taken along the line III—III in FIG. 2;

FIG. 4 is a sectional view taken along the line IV—IV in FIG. 2;

FIG. 5 is a sectional view taken along the line V—V in FIG. 2;

DESCRIPTION OF THE EMBODIMENT

An embodiment of the present invention will now be described with reference to the accompanying drawings.

Figure 1:
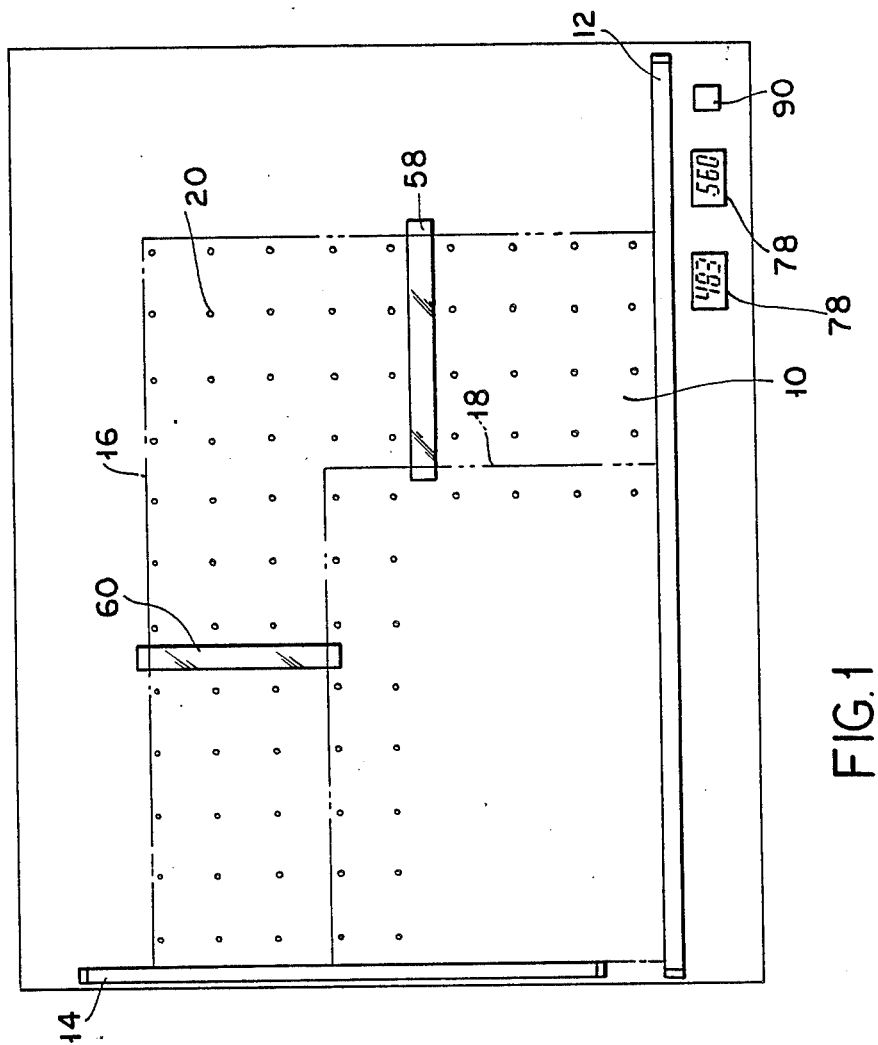
FIG. 1 is a plan view of an embodiment of the operation stand for a sheet-fed press according to the present invention.

In FIG. 1, an operation stand is shown in plan, and what are shown on this drawing are only the elements directly relating to the present invention, all of the other elements, for example, a push-button for controlling the quantity of ink being omitted. The operation stand originally has a flat table surface 10 for placing paper in a spread state thereon in order to study the density of ink. The table surface 10 is provided thereon with stopper means 12, 14 set up on the lower and left end portions thereof and extending at right angles to each other as if the stopper means constituted X- and Y-axes of coordinates. The stopper means 12, 14 consist of elongated guide bars arranged on the table surface 10 perpendicularly thereto as shown in FIG. 4, and they restrict the positions of the lateral and longitudinal edges of the paper and serve as reference members for the measurement of the size of the paper. A segment designated by a reference numeral 16 represents the size of the largest possible paper to be applied to the apparatus according to the present invention, and a segment designated by a reference numeral 18 the size of the smallest possible paper, the sizes of both of such paper being also measured with reference to the orthogonally arranged stopper means 12, 14.

On the table surface 10, especially, a region between the segments designated by the reference numerals 16, 18 is provided with numerous suction holes 20, whereby the interior of a box member 22 provided under the table surface 10 and the upper side of the table surface 10 are allowed to communicate with each other. The box member 22 is provided at the lower portion thereof with a suction fan 24, is adapted to suck the air in the interior of the box member 22 of a sealed construction and on the table surface 10 and apply a vacuum to the paper, which is thereby brought into close contact with and fixed to the table surface 10. Accordingly, the suction fan 24 constitutes a paper suction means.

Figure 2:
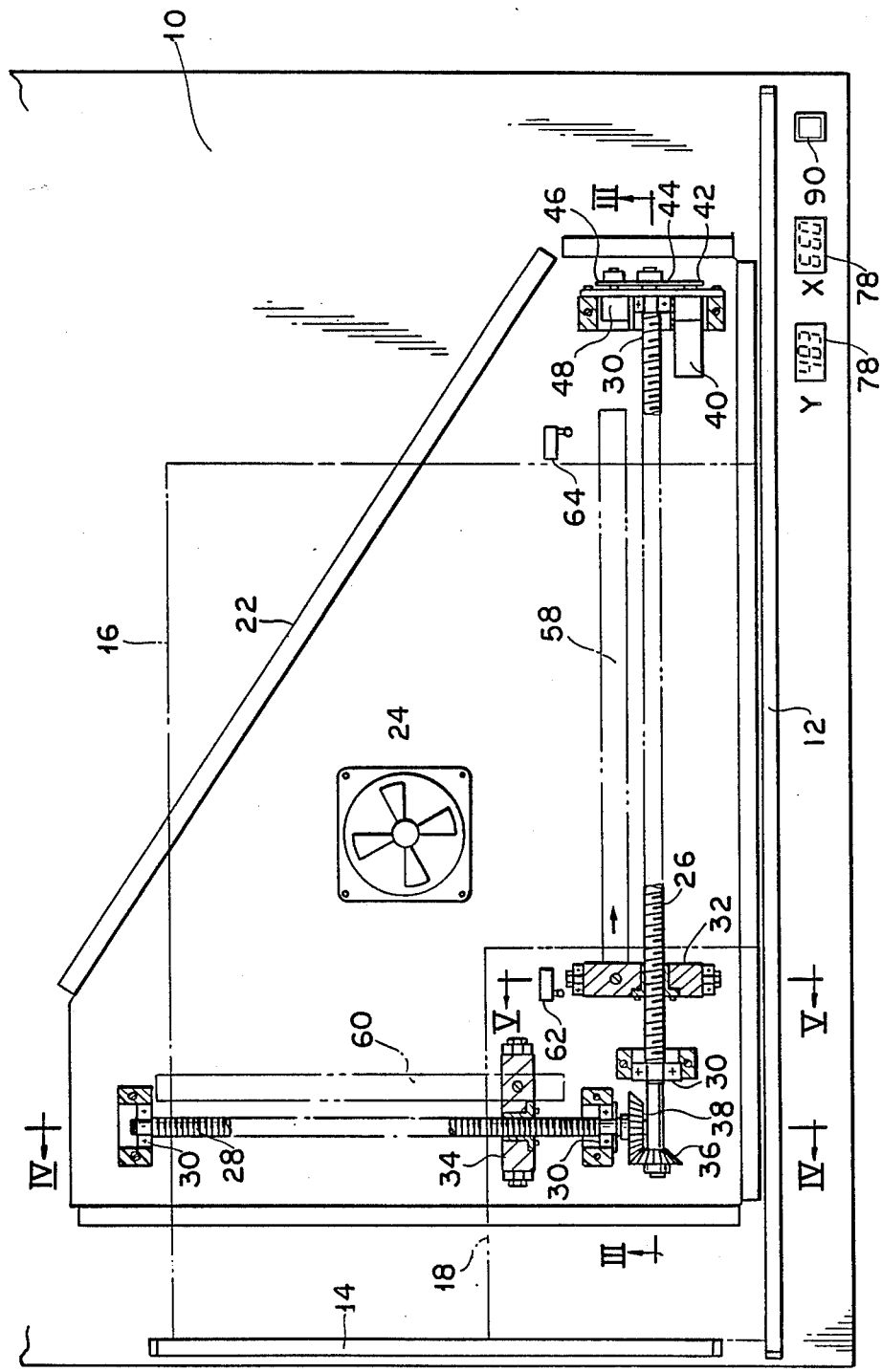
FIG. 2 is a plan view showing the construction of the inner portion of the operation stand.

As best seen in FIG. 2, the box member 22 below the table surface 10 is further provided therein with two guide shafts 26, 28 which extend in the lateral direction (direction of an X-axis) and longitudinal direction (direction of a Y-axis) of the paper, and which are supported at right angles to each other on bearings 30 so that the guide shafts 26, 28 can be turned. These guide shafts 26, 28 are formed as screw shafts so as to guide detectors 32, 34, which will be described later, for scanning the edge portions of the paper therewith, the guide shafts 26, 28 being connected to each other by pair of bevel gears 36, 38. In order to turn these guide shafts 26, 28, a motor 40 is provided near an end portion of one guide shaft 26, and the torque generated by this motor 40 is transmitted to the guide shaft 26 via gears 42, 44, and to a potentiometer 48 via a gear 46.

The detectors 32, 34 have substantially the same construction, and each of them consists as best seen in FIG. 5 of a head 50, which is moved by a guide shaft 26 or 28 formed as a screw shaft, and a detector body 52 composed of an optical means and adapted to detect an edge portion of the paper.

Of these parts, the head 50 has a screw nut (designated by a reference numeral 54) engaged with the guide shaft 26 or 28, and also a pair of guide bearings 56 adapted to be rolled as they contact the box member 22. The head 50 is moved in the direction of the X-axis or Y-axis in FIG. 2 in proportion to the quantity of turning of the guide shafts 26, 28 operated by the rotation of the motor 40.

The detector body 52 is a reflecting photosensor consisting of a light-emitting element, such as a LED and a light receiving element, such as a phototransistor. The detector bodies 52 are adapted to detect the light reflected on the paper, through light-transmitting windows 58, 60 provided so as to extend in the lateral and longitudinal directions of the paper over a region between the edges of the portions of the table surface 10 which indicate the sizes of the smallest and largest paper, whereby the positions of the edges of the paper are detected. These detectors 32, 34 constitute detecting means and send out information of the positions of the edges of the paper. A reference numeral 62 denotes a limit switch relative to the lateral direction of the smallest paper, and 64 a limit switch relative to the lateral direction of the largest paper, these switches 62, 64 being provided so as to prevent the overrunning of the detector 32.

Figure 6:
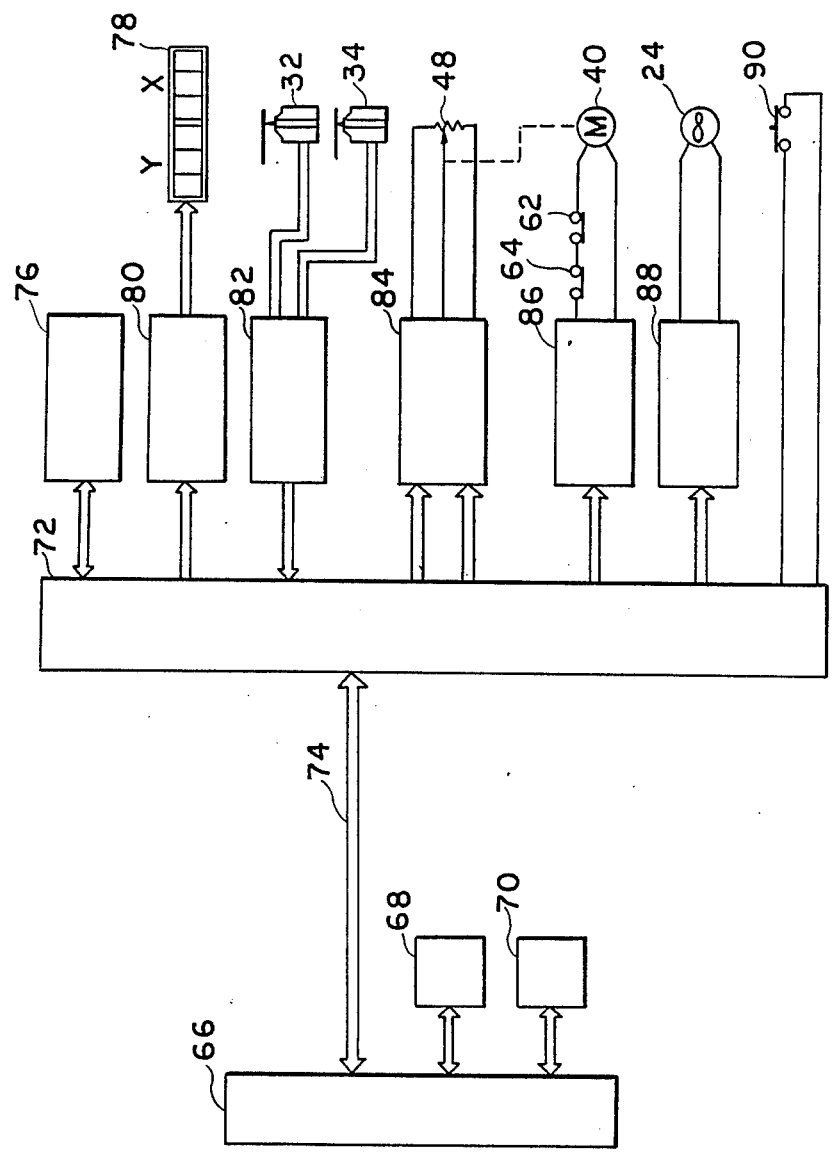
FIG. 6 is a block diagram of an arithmetic means.

FIG. 6 is a block diagram with a CPU (central processing unit) 66 forming the center thereof, and serving as an arithmetic means and a control means. A ROM 68 used to provide a control operation based on a flowchart which will be described later, and a RAM 70 for temporarily storing the size of the paper and the quantity of rotation detected by the potentiometer 48 are connected to the CPU 66. Various kinds of devices for performing actual operations based on the flowchart are also connected to the CPU 66 through an input-output port 72 and a data bus 74. A reference numeral 76 denotes a timer LSI adapted to set a predetermined time, such as the time of starting the suction fan 24 and the operating time of the motor 40, and 78 a means consisting of LED's and adapted to display the size of the paper, which display means 78 receives an output from a segment driver 80 and displays the sizes of the paper in the X- and Y-axis direction thereof in three digits in millimeter. The information on the positions of the edges of the paper in the X- and Y-axis directions is detected by the detectors 32, 34 and finally inputted to the CPU 66 through photosensor amplifier 82.

A reference numeral 48 denotes a potentiometer, which is adapted to detect the quantity of rotation of the motor 40 in cooperation with an A/D converter 84, and the quantities of movements of the detectors 32, 34 are calculated in the CPU 66 and RAM 70 on the basis of the information on this qunatity of rotation.

A reference numeral 40 denotes a motor for driving the guide shafts 26, 28. This motor 40 is operated by a motor driver 86 as it is restricted by the largest paper-side limit switch 64 and smallest paper-side limit switch 62.

A reference numeral 24 denotes a suction fan driven by a motor driver 88, and 90 paper size measuring start button.

Figure 7:
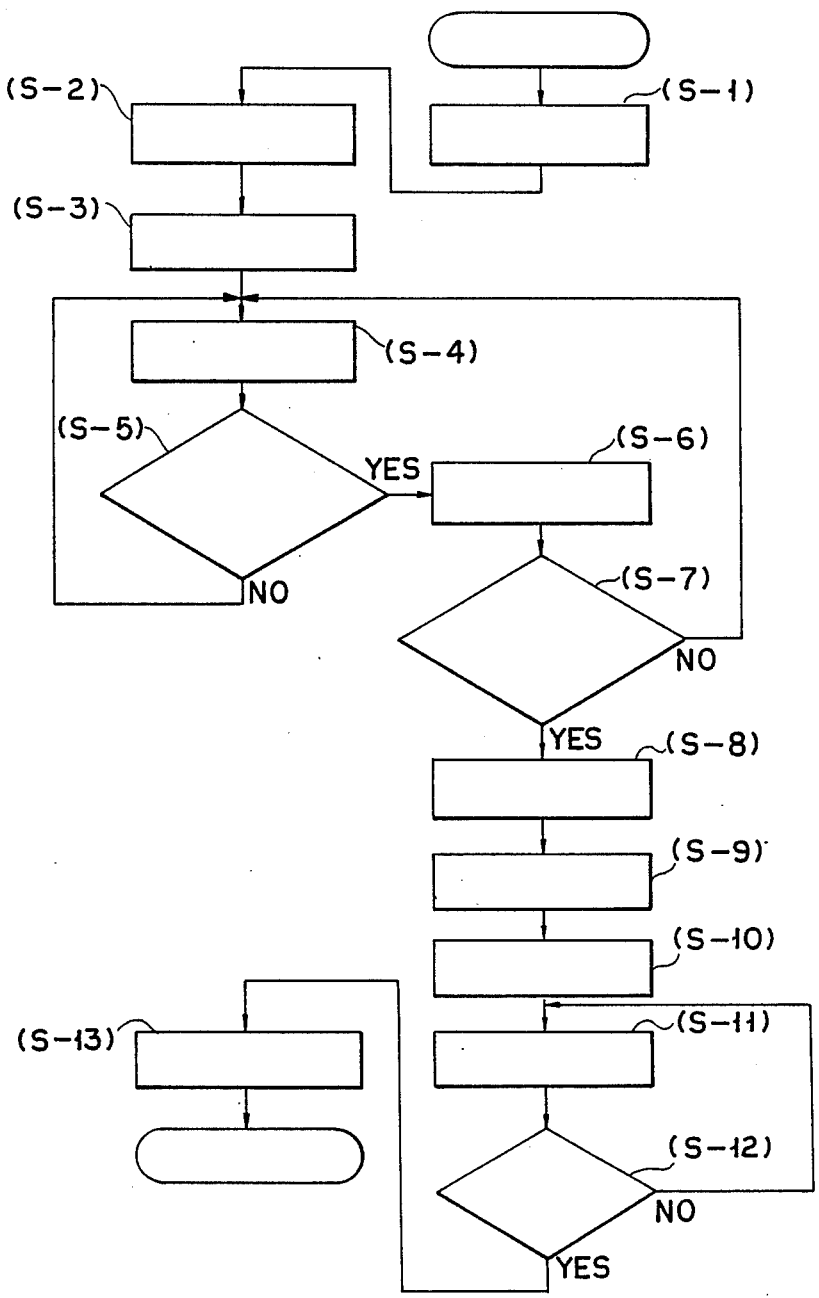
FIG. 7 is a flowchart showing the operations of the apparatus according to the present invention.

The operation of the present invention will now be described with reference to the flowchart in FIG. 7.

First, the paper the size of which is to be measured is placed on the flat table surface 10 of an operation stand, and the edges of the paper are pressed against the stopper means 12, 14, whereby the paper is positioned with the longitudinal and lateral edges thereof thus restricted.

When the paper size measuring start button 90 is pressed to start measuring the size of the paper, the suction fan 24 constituting the suction means is turned in a Step 1 (S-1) to suck the air from the upper side of the table surface 10 through the suction holes 20 and apply a vacuum to the paper, whereby the paper is brought into close contact with and fixed to the table surface 10 (Step 2 (S-2)).

In Step 3 (S-3), the detectors 32, 34 start detecting the positions of the edges of the paper, and the motor 40 begins to be rotated (forward)(Step 4 (S-4)), whereby the detectors 32, 34 start being moved with reference to the guide shafts 26, 28. In Step 5 (S-5), it is determined whether the position of the lateral edge of the paper is detected or not by the detector 32 for the lateral direction (X-axis), and the lateral size of the paper is then computed (Step 6 (S-6)).

Similarly, in Step 7 (S-7), it is determined whether the position of the longitudinal edge of the paper is detected or not by the detector 34 for the longitudinal direction (Y-axis), and the longitudinal size of the paper is then computed (Step 8 (S-8)).

When the computation based on the information on the positions of the edges of the paper has been finished, the motor 40 for driving the guide shafts 26, 28 is stopped (Step 9 (S-9)), and the longitudinal and lateral sizes of the paper are displayed on the display means 78 (Step 10 (S-10)).

The motor 40 is then rotated reversely (Step 11 (S-11)) in preparation for the subsequent measurement, and it is determined (Step 12 (S-12)) whether the motor has returned to the measurement starting position or not, the motor 40 being finally stopped (Step 13 (S-13)).

The present invention is not limited to the above-described embodiment; various modes of expansions and modifications can be made.

What is claimed is:

1. An operation stand for a sheet-fed press, comprising stopper means set up at the end portions of a table surface of said operation stand and adapted to restrict the positions of the longitudinal and lateral edges of paper, a suction means adapted to apply vacuum to said paper through numerous suction holes provided in the table, so as to bring said paper into close contact with and fix the same to said table surface, a detecting means adapted to scan said paper with a detector with reference to guide shafts extending under said table surface in the longitudinal and lateral directions of said paper and detect the positions of said longitudinal and lateral edges of said paper, an arithmetic means for calculating the size of said paper on the basis of the information on the positions of the edges thereof from said detecting means, and a display means for digitally displaying the size of said paper calculated by said arithmetic means.

* * * * *